(12) United States Patent
Saito et al.

(10) Patent No.: US 11,156,452 B2
(45) Date of Patent: Oct. 26, 2021

(54) SHAPE MEASURING DEVICE FOR HOSE CONNECTOR FITTING

(71) Applicant: The Yokohama Rubber Co., LTD., Tokyo (JP)

(72) Inventors: Takayuki Saito, Hiratsuka (JP); Akira Onodera, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/634,552

(22) PCT Filed: Jul. 25, 2018

(86) PCT No.: PCT/JP2018/027830
§ 371 (c)(1),
(2) Date: Jan. 27, 2020

(87) PCT Pub. No.: WO2019/022112
PCT Pub. Date: Jan. 31, 2019

(65) Prior Publication Data
US 2020/0263975 A1    Aug. 20, 2020

(30) Foreign Application Priority Data

Jul. 27, 2017 (JP) .............................. JP2017-145760

(51) Int. Cl.
*G01B 11/24* (2006.01)
(52) U.S. Cl.
CPC .................................... *G01B 11/24* (2013.01)

(58) Field of Classification Search
CPC ...... G01B 11/24; G01B 11/245; G01B 21/20; F16L 33/2076
USPC .................................................. 356/600–640
See application file for complete search history.

(56) References Cited

U.S. PATENT DOCUMENTS

2013/0253686 A1    9/2013 Flament et al.

FOREIGN PATENT DOCUMENTS

| JP | 2009-192258 | 8/2009 |
| JP | 2014-081024 | 5/2014 |
| JP | 2016-008673 | 1/2016 |
| WO | WO 2012/074527 | 6/2012 |

OTHER PUBLICATIONS

International Search Report for International Application No. PCT/JP2018/027830 dated Sep. 11, 2018, 2 pages, Japan.

*Primary Examiner* — Tri T Ton
(74) *Attorney, Agent, or Firm* — Thorpe North & Western (57) ABSTRACT

Provided is a shape measuring device for a hose connector fitting. Two-dimensional shape detection units detect radial position data of a surface of a socket in radial direction with respect to an axial center of a hose connector fitting along a direction parallel with the axial center of the hose connector fitting completely across a circumference of the socket. The measurement data relates to the surface of the socket, including outer diameters, crimping positions, crimping claw remaining widths, roundness, and cylindricity of the socket.

9 Claims, 11 Drawing Sheets

SHAPE MEASURING DEVICE FOR HOSE CONNECTOR FITTING

TECHNICAL FIELD

The present technology relates to a shape measuring device for a hose connector fitting.

BACKGROUND ART

A hose connector fitting that is coupled to an end portion of a hose for connecting the hose with a device has been provided.

The hose connector fitting includes a nipple and a socket that are coupled to each other, and an annular space is formed between an outer circumferential portion of the nipple and an inner circumferential portion of the socket.

The hose connector fitting is mounted to the hose end portion in the following manner. Under a state in which the hose is inserted into the annular space, an outer circumferential surface of the socket is crimped inward in a radial direction thereof within a crimping range along an axial direction of the socket (see Japan Unexamined Patent Publication No. 2014-081024).

In the related art, inspection of the hose connector fitting mounted to the end portion of the hose has been performed in the following manner. An outer diameter of the socket at a crimping position and a crimping position in a longitudinal direction of the socket at which the socket is crimped are manually measured through use of a pair of calipers. Further, cylindricity and roundness are calculated based on the measured diameter.

Then, measurement data such as a diameter, a crimping position, cylindricity, and roundness that are thus obtained are compared with reference ranges, and acceptance determination on the hose connector fitting is performed.

However, measurement that is manually performed through use of a pair of calipers largely varies in measurement data, and reproducibility of the measurement data cannot be said to be sufficient. Thus, there is room for improvement for performing acceptance determination on the hose connector fitting reliably and efficiently.

SUMMARY

The present technology has been made in view of the above-mentioned circumstances. The present technology provides a shape measuring device for a hose connector fitting, which has less varied measurement data, is advantageous in improving reproducibility of the measurement data, and is advantageous in performing acceptance determination on the hose connector fitting reliably and efficiently.

A shape measuring device for a hose connector fitting according to the present technology is provided, including a nipple and a socket, an outer circumferential surface of the socket being crimped inward in a radial direction within a crimping range along an axial direction of the socket under a state in which a hose is inserted into an annular space between an outer circumferential portion of the nipple and an inner circumferential portion of the socket, includes a fitting support portion that supports the nipple, a hose support portion that supports the hose, a two-dimensional shape detection unit configured to detect radial position data of a surface of the socket in a radial direction with respect to an axial center of the hose connector fitting along a direction parallel to the axial center of the hose connector fitting, and a rotary movement portion that moves the two-dimensional shape detection unit rotationally about the axial center of the hose connector fitting as a center to cause the two-dimensional shape detection unit to detect the radial position data completely across a circumference of the socket.

According to the present technology, the radial position data of the surface of the socket in radial direction with respect to the axial center of the hose connector fitting is detected along the direction parallel with the axial center of the hose connector fitting completely across the circumference of the socket. Thus, the accurate measurement data with less variation, which relates to the surface of the socket, can be obtained based on the radial position data of the surface of the socket.

Thus, as compared to a case where measurement data is acquired by manual work through use of a pair of calipers as in the related art, the present technology has less varied measurement data, is advantageous in improving reproducibility of the measurement data, and is advantageous in performing acceptance determination on the hose connector fitting reliably and efficiently.

DETAILED DESCRIPTION

Embodiments of the present technology will be described below with reference to the drawings.

First, a hose connector fitting to be mounted to an end portion of a hose will be described.

Figure 1:
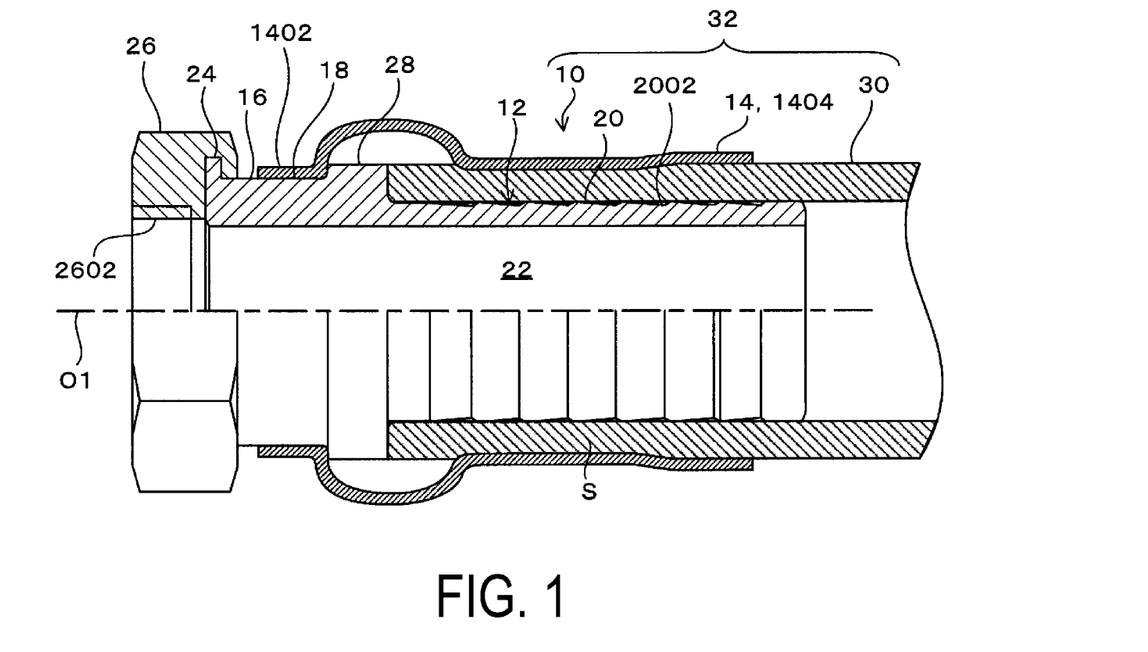
FIG. 1 is a side view illustrating a hose connector fitting and a hose in a partially breakaway manner.

As illustrated in FIG. 1, a hose connector fitting 10 includes a nipple 12 made of metal and a socket 14 made of metal.

The nipple 12 includes a mouthpiece portion 16, a socket crimping recess portion 18, and a core tube portion 20, which are coaxially arrayed, and a hole 22 for feeding fluid is formed coaxially with the mouthpiece portion 16, the socket crimping recess portion 18, and the core tube portion 20.

The mouthpiece portion 16 is removably coupled to a device side, and includes a flange portion 24 and a cap nut 26 that is rotatably provided to the flange portion 24. In the present embodiment, the mouthpiece portion 16 is female type.

The cap nut 26 is joined to an external thread on the device, and includes an inner circumferential portion made as an internal thread portion 2602.

Note that various types including a female type and a male type are conceivable for the configuration of the mouthpiece portion 16. The present technology is applicable to the hose connector fitting 10 including the nipple 12 of various types that are publicly known in the related art regardless of the configuration of the mouthpiece portion 16.

The socket crimping recess portion 18 is provided coaxially with the mouthpiece portion 16.

In the present embodiment, a large diameter portion 28 is provided to face the flange portion 24, and the socket crimping recess portion 18 is provided continuously completely across a circumference in an axial direction and a circumferential direction between the large diameter portion 28 and the cap nut 26.

The core tube portion 20 protrudes from the large diameter portion 28, and is coupled to an end portion of a hose 30.

A plurality of hose retaining recess portions 2002 are provided in an outer circumferential surface of the core tube portion 20, and each of the recess portions 2002 are continuous in the circumferential direction of the core tube portion 20.

The socket 14 covers across a part from the core tube portion 20, the large diameter portion 28 and to the socket crimping recess portion 18, and is mounted to the nipple 12 by crimping an end portion 1402 of the socket 14 on the socket crimping recess portion 18 to the socket crimping recess portion 18.

When the socket 14 is mounted to the nipple 12 as described above, an annular space S into which the end portion of the hose 30 is inserted is formed between the outer circumferential surface of the core tube portion 20 and an inner circumferential surface of the socket 14, which faces the outer circumferential surface.

The annular space S includes an opening portion being the nipple 12 and an end portion 1404 of the socket 14, which are positioned on a side opposite to the large diameter portion 28.

The hose 30 is made of rubber, and has flexibility.

The hose 30 includes, for example, an inner surface rubber layer, a reinforcing layer formed on an outer side of the inner surface rubber layer, an outer surface rubber layer formed on an outer side of the reinforcing layer.

Under a state in which the hose 30 is inserted into the annular space S, the socket 14 is crimped inward in a radial direction thereof within a crimping range along the axial direction of the socket 14. With this, under a state in which a circumference of an inner circumferential surface of the inner surface rubber layer of the hose 30 is completely held into close contact with completely across a circumference of an outer circumferential surface of the nipple 12, the hose connector fitting 10 is mounted to the hose 30.

Figure 9:
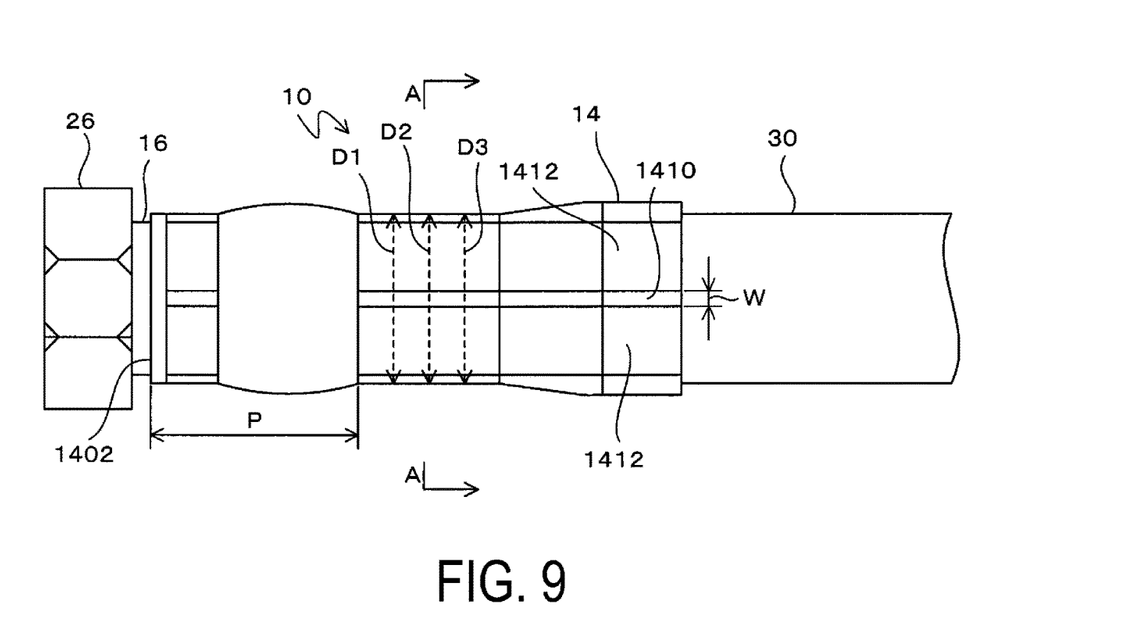
FIG. 9 is a first view illustrating a definition for measurement data on a hose connector fitting.
Figure 10:
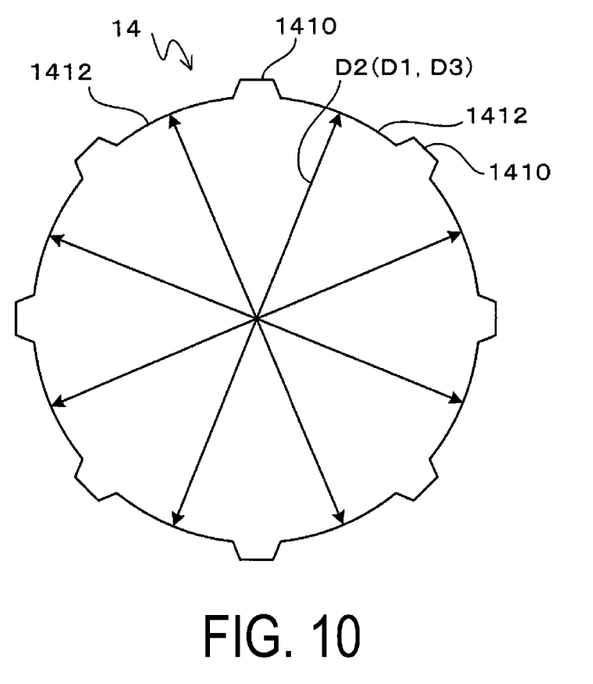
FIG. 10 is a second view illustrating the definition for the measurement data on the hose connector fitting and illustrating only a contour of a surface of a socket correspondingly to an A-A cross section of FIG. 9.

Note that, in the present embodiment, by crimping the socket 14, recess portions 1412 and protrusion portions 1410 extending in the axial direction of the socket 14 are formed and arrayed alternately in the circumferential direction of the socket 14 as illustrated in FIGS. 9 and 10, and an axial cross-sectional shape of the socket 14 is substantially flat as illustrated in FIG. 1. Such case will be described. However, the crimping configuration is freely selected. Various crimping configurations that are publicly known in the related art can be adopted, including, for example, wave crimping in which recess portions and protrusion portions extending in the circumferential direction of the socket 14 are formed and arrayed alternately in the axial direction of the socket 14, and an axial cross-sectional shape of the socket 14 has a wave form.

Further, the hose 30 may be formed of a synthetic resin instead of rubber, and various materials that are publicly known in the related art may be adopted as the hose 30.

With this, an assembly 32 of the hose 30 and the hose connector fitting 10 is obtained.

Next, a shape measurement device for a hose connector fitting (hereinafter, referred to as a shape measurement device) will be described.

Figure 2:
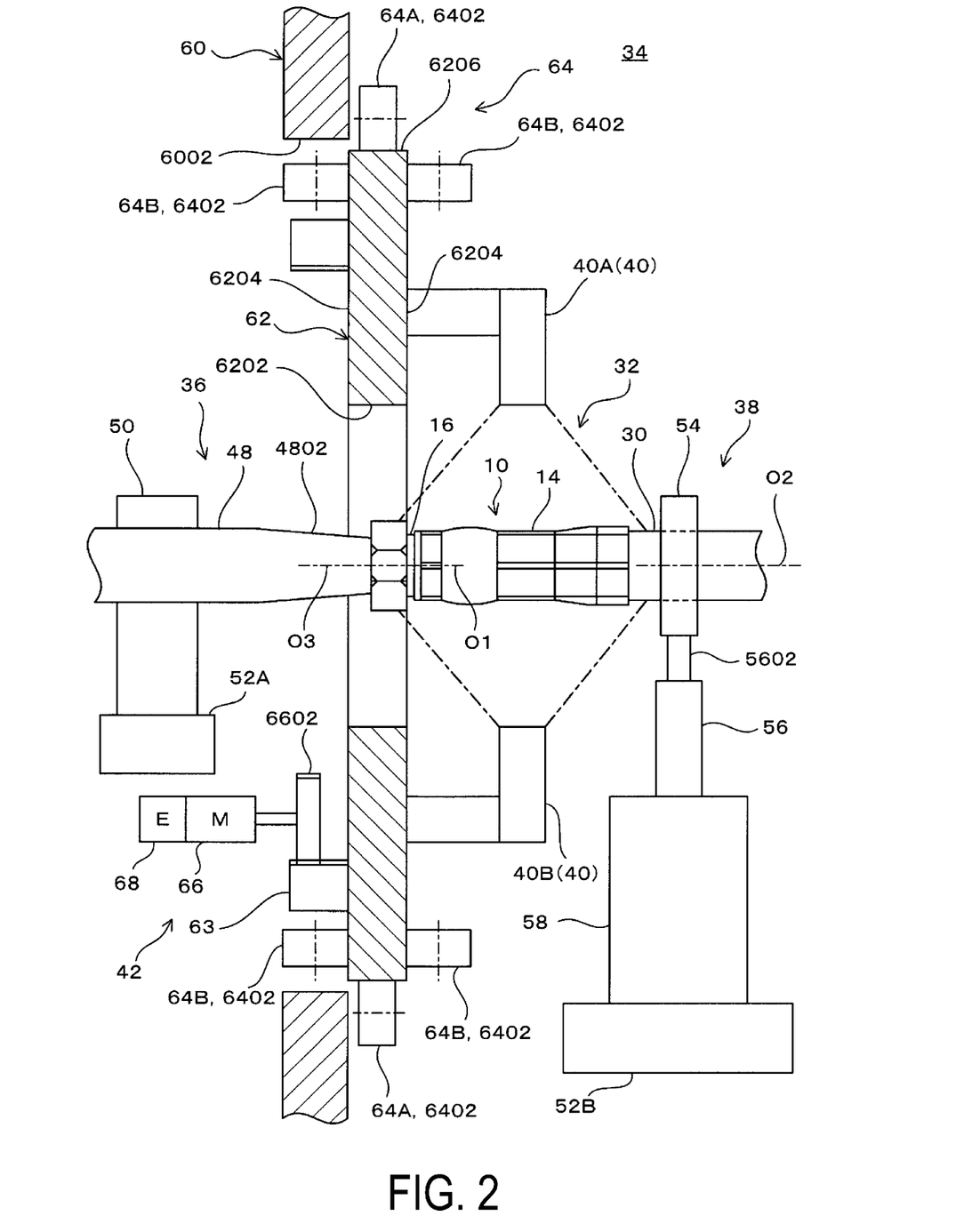
FIG. 2 is a vertically-sectional view of a shape measuring device for a hose connector fitting according to an embodiment.
Figure 8:
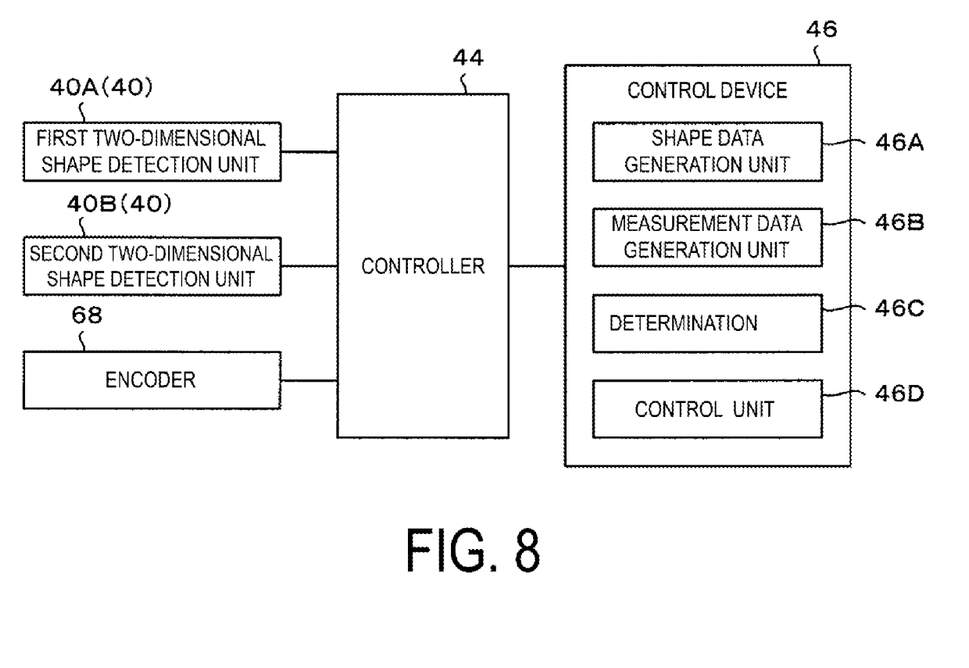
FIG. 8 is a block diagram of the shape measuring device for a hose connector fitting according to the embodiment.

As illustrated in FIG. 2, a shape measuring device 34 includes a fitting support portion 36, a hose support portion 38, two-dimensional shape detection units 40, a rotary movement portion 42, a controller 44 (FIG. 8), and a control device 46 (FIG. 8).

The fitting support portion 36 supports the axial center O1 of the nipple 12 of the hose connector fitting 10 of the assembly 32, that is, the axial center O1 of the hose connector fitting 10 in an aligning state.

The fitting support portion 36 includes a shaft member 48 and a fitting-side support member 50 that supports the shaft member 48.

The shaft member 48 includes a distal end provided with an engaging portion 4802, which is formed of a conic surface and aligns the axial center O1 of the hose connector fitting 10 by being engaged with the hole 22 of the mouthpiece portion 16 of the nipple 12 of the hose connector fitting 10 of the assembly 32.

The shaft member 48 is supported by the fitting-side support member 50 under a state in which the axial center is oriented in a horizontal direction.

The fitting-side support member 50 is supported on a 3-axis table 52A placed in a horizontal plane, and the fitting-side support member 50 is adjustable by a unit of μm in an X-axis direction and a Y-axis direction orthogonal on the horizontal plane, and a Z-axis direction being a vertical direction.

The hose support portion 38 supports the hose 30 under a state in which an axial center O2 of the hose 30 of the assembly 32 is aligned.

Figure 4:
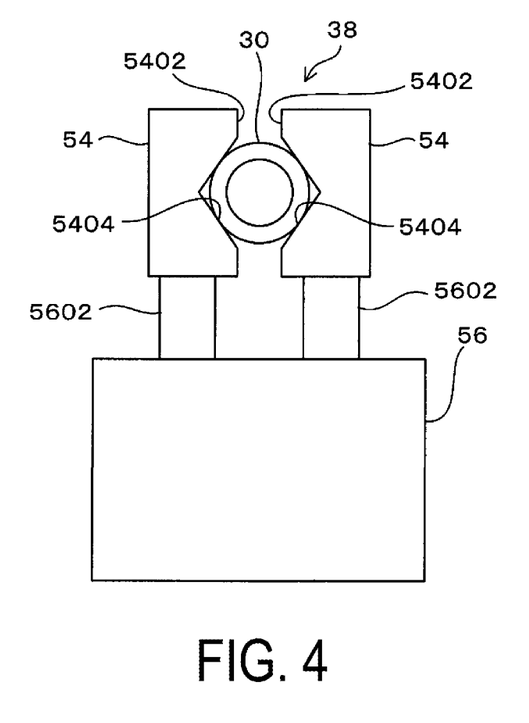
FIG. 4 is a front view of a hose support portion.

As illustrated in FIGS. 2 and 4, the hose support portion 38 includes a pair of clamp members 54, an actuator 56, and a hose-side support member 58.

In surfaces 5402 of the pair of clamp members 54 facing each other, V-shaped grooves 5404, which align the axial center O2 of the hose 30 by being engaged with an outer circumferential surface of the hose 30 of the assembly 32 are formed.

In the present embodiment, the actuator 56 is formed of a parallel hand that horizontally moves a pair of arms 5602 in an approaching and separating direction.

The pair of clamp members 54 is mounted to the pair of arms 5602, and the actuator 56 horizontally moves the pair of clamp members 54 in the approaching and separating direction along the horizontal direction. With this, the pair of clamp members 54 are moved between a clamping position of clamping the outer circumferential surface of the hose 30 of the assembly 32 and a releasing position of releasing the clamping state.

The hose-side support member 58 supports the actuator 56 so that the facing surfaces 5402 of the pair of clamp members 54 extend along the vertical direction and that the V-shaped grooves 5404 of the pair of clamp members 54 extend in the horizontal direction.

The hose-side support member 58 is supported on a 3-axis table 52B placed on the horizontal plane, and the hose-side support member 58 is adjustable by a unit of μm in the X-axis direction and the Y-axis direction orthogonal on the horizontal plane, and the Z-axis direction being the vertical direction.

The 3-axis table 52A supporting the fitting-side support member 50 and the 3-axis table 52B supporting the hose-side support member 58 perform adjustment for positioning so that the axial center O1 of the hose connector fitting 10 and the axial center O2 of the hose 30 match with an axial center O3 of a rotary plate 62 described later under a state in which the fitting support portion 36 supports the nipple 12, and the hose support portion 38 supports the hose 30.

Figure 5:
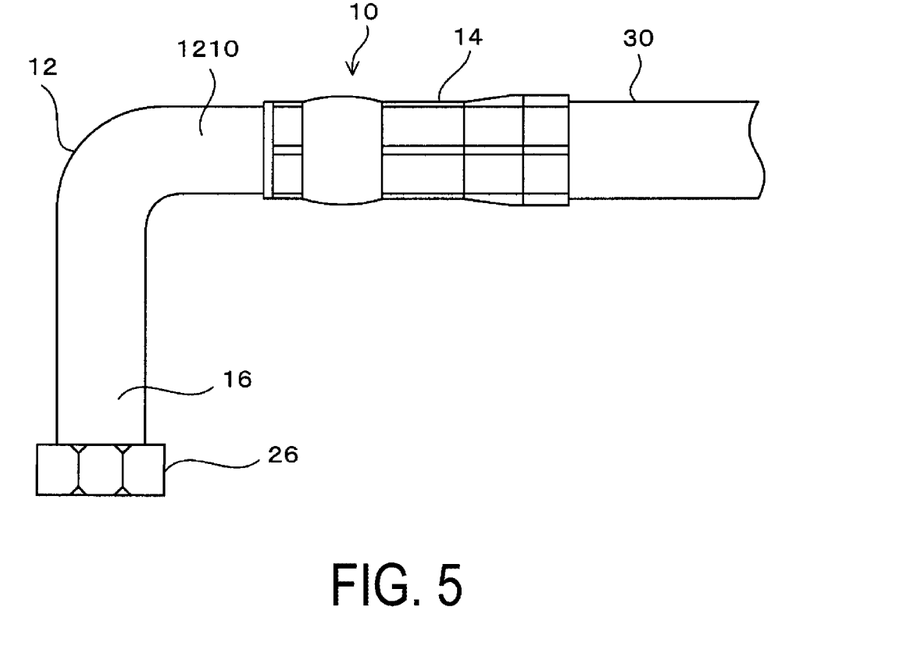
FIG. 5 is a side view illustrating an example of a bent type hose connector fitting.

Note that, when the hose connector fitting 10 is a bent type including the nipple 12 that is bent as illustrated in FIG. 5, using, similarly to the hose support portion 38, the pair of clamp members 54 including the V-shaped grooves 5404 as the fitting support portion 36 and a member for supporting an outer circumferential surface of a portion 1210 of the nipple 12, which is close to the socket 14, is sufficient.

As illustrated in FIG. 2, the rotary movement portion 42 moves the two-dimensional shape detection units 40 rotationally about the axial center O1 of the hose connector fitting 10 as the center so that the two-dimensional shape detection units 40 detect radial position data of the socket 14 in the radial direction with respect to the axial center O1 of the hose connector fitting 10 completely across the circumference of the socket 14.

Figure 3:
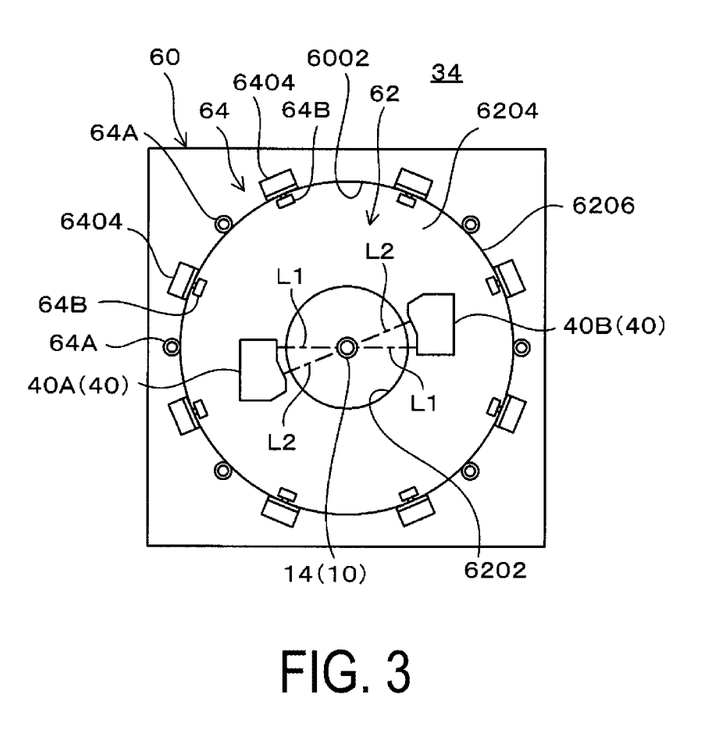
FIG. 3 is a front view illustrating the shape measuring device for a hose connector fitting according to the embodiment.

As illustrated in FIGS. 2 and 3, in the present embodiment, the rotary movement portion 42 includes a base 60, the rotary plate 62, a rotary support mechanism 64, and a motor 66.

The base 60 has a rectangular plate shape with an even thickness, and the thickness direction thereof is supported by a frame (not illustrated) toward the horizontal direction.

A circular base hole 6002 passing through in the thickness direction is formed in the center part of the base 60.

The rotary plate 62 has a circular plate shape with an even thickness.

The rotary plate 62 includes a hole 6202, which is formed to have such size that the assembly 32 can be inserted into a center part thereof, a pair of annular side surfaces 6204 positioned on both sides in the thickness direction, and an outer circumferential surface 6206 connecting outer circumferential parts of the pair of annular side surfaces 6204.

The rotary plate 62 is rotatably supported by the base 60 through intermediation of the rotary support mechanism 64 under a state in which the axial center O3 of the rotary plate 62 matches with an axial center of the base hole 6002.

One side surface 6204 of the rotary plate 62 is provided with a ring gear 63 extending coaxially with the rotary plate 62, and a tooth portion is formed on an inner circumferential portion of the ring gear 63.

The rotary support mechanism 64 are formed of a plurality of first cam followers 64A and a plurality of second cam followers 64B, which are provided to the base 60 at an interval in the circumferential direction of the base hole 6002.

Each of the first cam followers 64A and the second cam followers 64B includes a shaft (not shown) and a cylindrical ring 6402 that is rotatably coupled to the shaft.

The plurality of first cam followers 64A are provided at a plurality of positions at an interval in the circumferential direction of the outer circumferential surface 6206 of the rotary plate 62, and the shafts thereof are mounted to the base 60 in the periphery of the base hole 6002 in a position adjustable manner.

The plurality of second cam followers 64B are provided at a plurality of positions at an interval in the circumferential direction of the outer circumferential surface 6206 of the rotary plate 62, and the shafts thereof are mounted to brackets 6404 in a position adjustable manner. The brackets are supported by the base 60 in the periphery of the base hole 6002.

In FIG. 2, both the first cam followers 64A and the second cam followers 64B are illustrated as a matter of convenience. However, the first cam followers 64A and the second cam followers 64B are provided at positions in phases shifted in the circumferential direction of the rotary plate 62.

The plurality of first cam followers 64A are engaged with the outer circumferential surface 6206 at a plurality of positions at an interval in the circumferential direction of the outer circumferential surface 6206 of the rotary plate 62, and determine positions in a direction orthogonal to a direction of the axial center O3 of the rotary plate 62.

The plurality of second cam followers 64B are engaged with the side surfaces 6204 on both the sides of the rotary plate 62 at a plurality of positions at an interval in the circumferential direction of the outer circumferential surface 6206 of the rotary plate 62, and determine positions in the direction of the axial center O3 of the rotary plate 62.

Accordingly, the rotary plate 62 has the axial center O3 determined by the plurality of first cam followers 64A and the plurality of second cam followers 64B, and the axial center O3 of the rotary plate 62 is position adjustable by the plurality of first cam followers 64A and the plurality of second cam followers 64B.

The motor 66 transmits a rotary driving force to the ring gear 63 through a drive gear 6602 mounted to a drive shaft thereof, and is mounted to the base 60 by a metal fitting (not illustrated).

The motor 66 include the encoder 68 that generates a detection signal corresponding to a rotation amount.

Accordingly, when the motor 66 is rotated, the rotary plate 62 is rotationally driven about the axial center O3 as the center through the drive gear 6602 and the ring gear 63. In other words, the rotary plate 62 is rotationally driven about the axial center O2 of the hose 30 and the axial center O1 of the hose connector fitting 10 as the center.

Further, in the present embodiment, a control backlash gear, a no-backlash gear, or the like is used as the drive gear 6602, and thus backlash is suppressed.

With this, backlash of the two-dimensional shape detection units 40, which are rotationally driven about the axial center O1 of the hose connector fitting 10 as the center, is prevented, and accuracy of a rotational angle is secured. Thus, accuracy of the radial position data of the socket 14 in the radial direction with respect to the axial center O1 of the hose connector fitting 10, which is obtained by the two-dimensional shape detection units 40, is improved.

Note that, in the present embodiment, a case is described where the rotary movement portion 42 uses the ring gear 63 and the drive gear 6602 to cause the two-dimensional shape detection units 40 to be move rotationally about the axial center O1 of the hose connector fitting 10 as the center. However, as long as the rotary movement portion 42 moves the two-dimensional shape detection units 40 rotationally about the axial center O1 of the hose connector fitting 10 as the center, the rotary movement portion 42 may have a freely-selectable configuration.

For example, as a mechanism of transmitting a rotary driving force to the rotary plate 62, a driving-side pulley driven by the motor 66, a driven-side pulley applying a rotary driving force to the rotary plate 62, and a timing belt stretched between those pulleys may be used. In this manner, various rotary driving mechanism that are publicly known in the related art can be used.

The two-dimensional shape detection units 40 are two-dimensional shape detectors configured to detect the radial position data of the socket 14 in the radial direction with respect to the axial center O1 of the hose connector fitting 10 along a direction parallel with the axial center O1 of the hose connector fitting 10.

Figure 6:
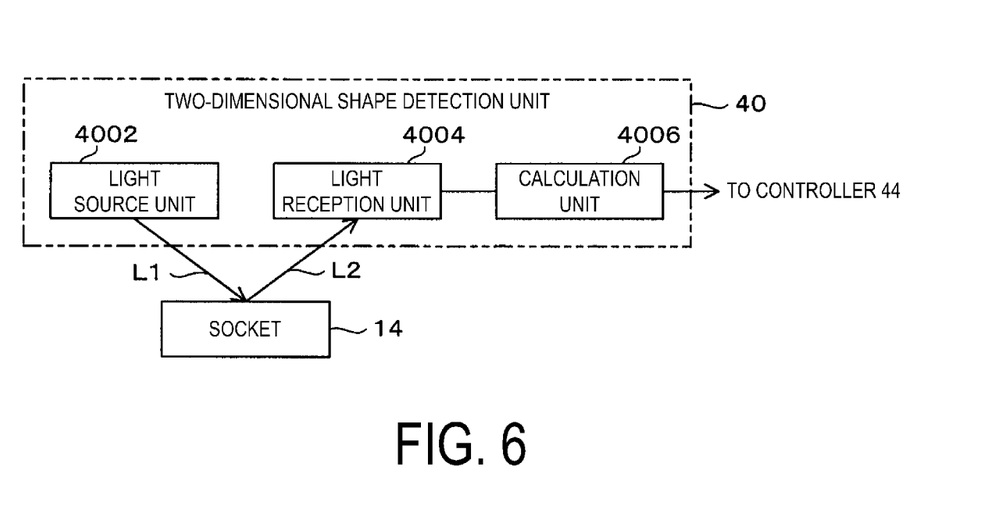
FIG. 6 is a block diagram illustrating a configuration of a two-dimensional shape detection unit.

As illustrated in FIG. 6, the two-dimensional shape detection unit 40 includes a light source unit 4002, a light reception unit 4004, and a calculation unit 4006.

The light source unit 4002 irradiates the surface of the socket 14 with belt-like shape detection light L1 having a width direction parallel with the axial center O1 of the hose connector fitting 10.

Laser light, in the present embodiment, blue laser light is used as the detection light L1.

The surface of the socket 14 is irradiated with the blue laser, which is advantageous in improving detection accuracy with less diffused reflection. The light reception unit 4004 receives reflection light L2 being light reflected on the surface, and detects position data of the reflection light L2.

The calculation unit 4006 calculates the radial position data from the position data, based on a triangulation ranging method.

In the present embodiment, as illustrated in FIGS. 2 and 3, the two two-dimensional shape detection units 40, namely, first and second two-dimensional shape detection units 40A and 40B are mounted to the rotary plate 62 at positions at an equal interval in the circumferential direction of the rotary plate 62, which match with each other in the radial direction of the rotary plate 62. Accordingly, the first and second two-dimensional shape detection units 40A and 40B are mounted at the positions on the rotary plate 62, which are shifted by 180 degrees in phase.

Thus, when the rotary movement portion 42 rotates the rotary plate 62 by 180 degrees, the first and second two-dimensional shape detection units 40A and 40B detect the radial position data of the socket 14 in the radial direction with respect to the axial center O1 of the hose connector fitting 10 completely across the circumference of the socket 14.

Note that the number of two-dimensional shape detection units 40 may be one. In this case, rotating the rotary plate 62 by the rotary movement portion 42 by 360 degrees, and thus one two-dimensional shape detection unit 40 detecting the radial position data of the socket 14 completely across the circumference of the socket 14, is sufficient.

Further, the number of two-dimensional shape detection units 40 may be three. In this case, rotating the rotary plate 62 by the rotary movement portion 42 by 120 degrees, and thus three two-dimensional shape detection unit 40 detecting the radial position data of the socket 14 completely across the circumference of the socket 14, is sufficient.

Thus, as the number of two-dimensional shape detection units 40 is increased, a rotation amount of the rotary plate 62 can be reduced, which is thus advantageous in reducing a time period required for detecting the radial position data of the socket 14 in the radial direction completely across the circumference of the socket 14.

As illustrated in FIG. 8, the controller 44 is connected to the encoder 68 and the first and second two-dimensional shape detection units 40A and 40B with cables (not illustrated).

The controller 44 receives a detection signal corresponding to a rotation amount of the motor 66 from the encoder 68, receives the radial position data of the socket 14 from the first and second two-dimensional shape detection units 40A and 40B, and generates data obtained by synchronizing an angle position of the socket 14 in the circumferential direction and the radial position data of the socket 14 in the radial direction, in other words, generates the radial position data of the socket 14 in the radial direction in association with the angle position of the socket 14 in the circumferential direction.

Figure 7:
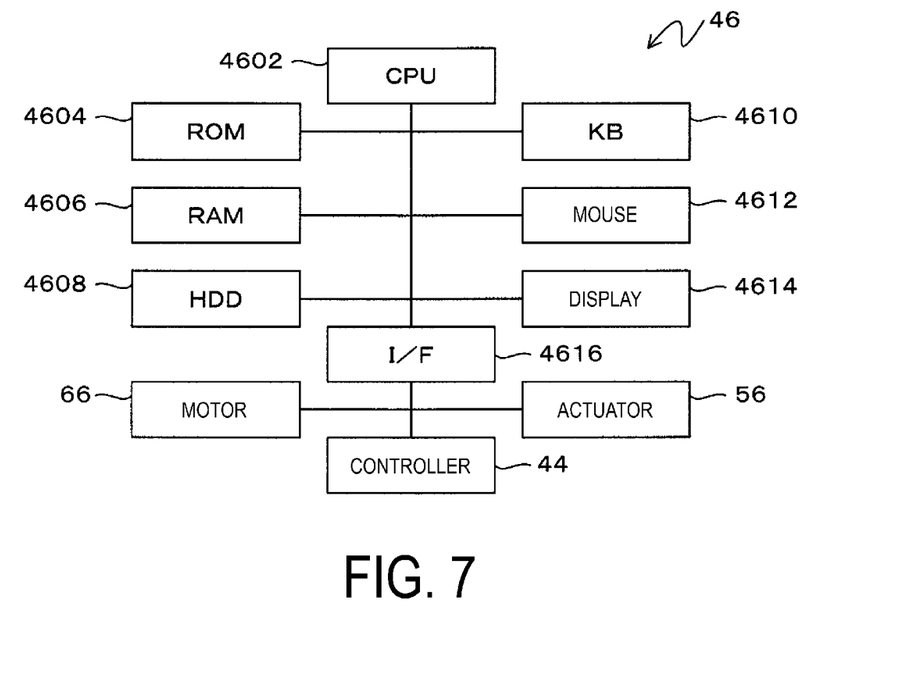
FIG. 7 is a block diagram of a personal computer constituting a control device.

As illustrated in FIG. 7, the control device 46 is formed of a personal computer, and includes a CPU (Central Processing Unit) 4602, and a ROM (Read Only Memory) 4604, a RAM (Random Access Memory) 4606, a hard disk device 4608, a keyboard 4610, a mouse 4612, a display 4614, and an interface 4616, which are connected through interface circuits and bus lines (not illustrated).

The ROM 4604 stores control programs, and the RAM 4606 provides a working area.

The hard disk device 4608 stores control programs and the like for implementing a shape data generation unit 46A, a measurement data generation unit 46B, a determination unit 46C, and a control unit 46D, which will be described later.

The keyboard 4610 and the mouse 4612 receive an input operation performed by an operator.

The display 4614 outputs data on display.

The interface 4616 transmits and receives data and signals with external devices. In the present embodiment, the interface 4616 receives, from the controller 44, the radial position data of the socket 14 in the radial direction in association with the angle position of the socket 14 in the circumferential direction, and transmits control signals to the actuator 56 and the motor 66.

The CPU 4602 executes the control programs stored in the hard disk device 4608. With this, as illustrated in FIG. 8, the shape data generation unit 46A, the measurement data generation unit 46B, the determination unit 46C, and the control unit 46D are implemented.

The shape data generation unit 46A generates shape data indicating a three-dimensional shape of the surface of the socket 14, based on the radial position data, which is detected by the two-dimensional shape detection units 40 completely across the circumference of the socket 14.

The measurement data generation unit 46B generates measurement data relating to the surface of the socket 14 from the shape data.

In the present embodiment, examples of the measurement data relating to the surface of the socket 14 is as listed below, and twenty-eight pieces of the measurement data in total are acquired for each hose connector fitting 10.

Note that the measurement data is not limited to the examples listed below, and is set as appropriate as a matter of course.

(1) Outer Diameter of Socket 14

As illustrated in FIG. 9, within a crimped range of the socket 14, three outer diameters differing in positions on the socket 14 in the longitudinal direction are referred to as a first outer diameter D1, a second outer diameter D2, and an outer third diameter D3.

The positions of the first outer diameter D1, the second outer diameter D2, and the third outer diameter D3 on the socket 14 in the longitudinal direction are, for example, defined by distances from the end portion 1402 of the socket 14 on the socket crimping recess portion 18 side.

Further, as illustrated in FIG. 10, for each of the first outer diameter D1, the second outer diameter D2, and the third outer diameter D3, four dimensions of the socket 14 every 45 degrees in the circumferential direction are measured.

Accordingly, twelve outer diameters in total are measured.

(2) Crimping Position

As illustrated in FIG. 9, within the crimped range of the socket 14 from the end portion 1402 of the socket 14 on the socket crimping recess portion 18 side, a distance to a position on a side close to the mouthpiece portion 16 of the socket 14 is referred to as a crimping position P.

Further, eight crimping positions P are measured every 45 degrees in the circumferential direction of the socket 14.

(3) Crimping Claw Remaining Width

As illustrated in FIGS. 9 and 10, distances between the protrusion portions 1410 in the circumferential direction, which are formed along the longitudinal direction at an interval in the circumferential direction of the socket 14, are referred to as crimping claw remaining widths W.

In the present embodiment, eight crimping claws are used, and hence eight crimping claw remaining widths W are measured.

(4) Roundness

A difference between a maximum value and a minimum value of the second outer diameter D2 indicates roundness.

Accordingly, one roundness is measured.

(5) Cylindricity

A difference between the first outer diameter D1 and the third outer diameter D3 indicates cylindricity.

For each of the first outer diameter D1 and the third outer diameter D3, measurement is performed four times every 45 degrees in the circumferential direction of the socket 14. Thus, cylindricity is calculated four times every 45 degrees in the circumferential direction of the socket 14.

The determination unit 46C compares the measurement data and reference ranges set in advance, and perform acceptance determination.

A result of acceptance determination is displayed on the display of the control device 46, for example, or alternatively, is notified with an information lamp, which is connected to the control device 46 and is installed in a work place.

The control unit 46D controls the actuator 56 and the motor 66.

Figure 11:
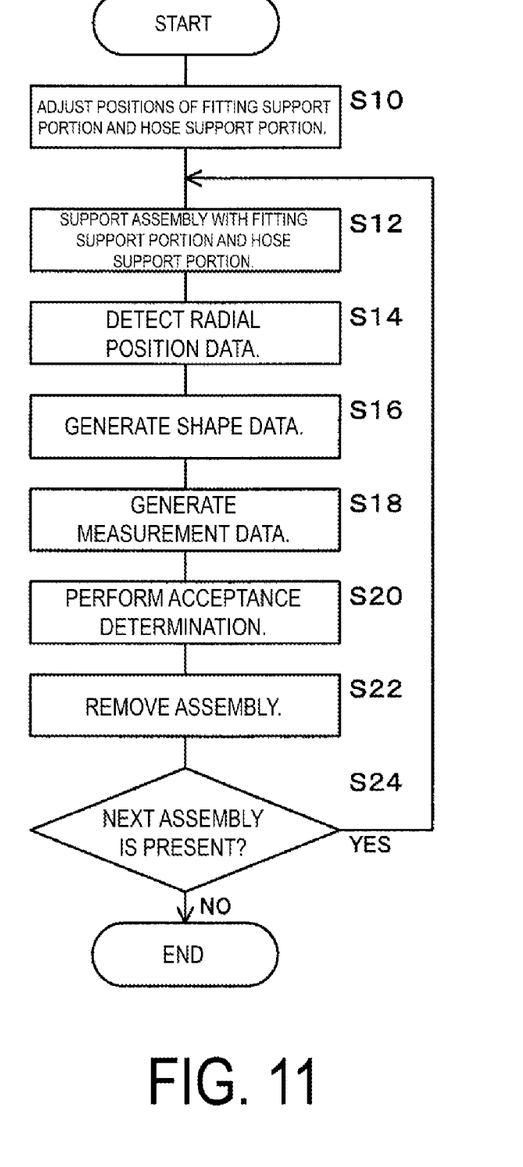
FIG. 11 is a flowchart illustrating an operation of the shape measuring device for a hose connector fitting according to the embodiment.

Next, an operation of the shape measuring device 34 will be described with reference to a flowchart in FIG. 11.

Prior to measurement performed by the shape measuring device 34, the positions of the fitting support portion 36 and the hose support portion 38 are adjusted (Step S10).

The position of the fitting support portion 36 is adjusted in the following manner.

A dial gauge is fixed to the rotary plate 62, and a probe of the dial gauge is held into contact with an outer circumferential surface of the shaft member 48.

Subsequently, the rotary plate 62 is rotated, and a deviation amount between the axial center of the shaft member 48 and the axial center O3 of the rotary plate 62 is measured with the dial gauge. Then, the 3-axis adjustment table 52A of the fitting support portion 36 is adjusted to eliminate the deviation amount.

The position of the hose support portion 38 is adjusted in the following manner.

The hose support portion 38 is caused to support a core bar that is accurately processed to have an even diameter and a linear shape.

The dial gage is fixed to the rotary plate 62, and the probe of the dial gauge is held into contact with an outer circumferential surface of the core bar.

Subsequently, the rotary plate 62 is rotated, and a deviation amount between an axial center of the core bar and the axial center O3 of the rotary plate 62 is measured. Then, the 3-axis adjustment table 52B of the fitting support portion 36 is adjusted to eliminate the deviation amount.

When adjustment of the position of the fitting support portion 36 and the position of the hose support portion 38 is completed, the dial gauge is removed from the rotary plate 62, and the core bar is removed from the hose support portion 38.

Subsequently, the assembly 32 being a measurement target is supported by the fitting support portion 36 and the hose support portion 38 (Step S12).

That is, the engaging portion 4802 of the fitting support portion 36 is engaged with the hole 22 of the nipple 12 of the hose connector fitting 10 of the assembly 32 being a measurement target.

Then, when the part of the hose 30 of the assembly 32 are positioned between the V-shaped grooves 5404 of the pair of clamp members 54 being a releasing position of the hose support portion 38, the actuator 56 is actuated under control of the control unit 46D, the pair of clamp members 54 is moved to the clamping positions, and the parts of the hose 30 are clamped between the V-shaped grooves 5404 of the pair of clamp members 54.

With this, the axial center O1 of the hose connector fitting 10 of the assembly 32 matches with the axial center O3 of the rotary plate 62.

Subsequently, under control of the control unit 46D, the motor 66 is rotationally driven to rotate the rotary plate 62 by 180 degrees, and the first and second two-dimensional shape detection units 40A and 40B detect the radial position data of the surface of the socket 14 in radial direction with respect to the axial center O1 of the hose connector fitting 10 along the direction parallel with the axial center O1 of the hose connector fitting 10 (Step S14).

When the radial position data of the surface of the socket 14 in radial direction with respect to the axial center O1 of the hose connector fitting 10 completely across the circumference of the socket 14 is detected, the control device 46 generates the shape data indicating the three-dimensional shape of the surface of the socket 14, based on the radial position data completely across the circumference of the socket 14, which is detected by the first and second two-dimensional shape detection units 40A and 40B (Step S16: the shape data generation unit 46A).

Then, the control device 46 generates the measurement data relating to the surface of the socket 14 from the shape data (Step S18: the measurement data generation unit 46B).

When the measurement data is generated, acceptance determination is performed based on the measurement data (Step S20: the determination unit 46C).

When acceptance determination is completed, the hose support portion 38 is operated to cancel clamping of the hose 30, and the assembly 32 is removed from the fitting support portion 36 and the hose support portion 38 (Step S22).

Further, whether a subsequent assembly 32 is present is determined (Step S24).

In a case of "No" in Step S24, the operation is completed. In a case of "Yes", the operation returns to Step S12, and the subsequent assembly 32 is measured.

Those operations are repeated, and thus measurement of the assembly 32 is performed.

In the present embodiment, through use of the two-dimensional shape detection units 40, the radial position data of the surface of the socket 14 in radial direction with respect to the axial center O1 of the hose connector fitting 10 is detected along the direction parallel with the axial center O1 of the hose connector fitting 10 completely across the circumference of the socket 14.

Accordingly, the measurement data relating to the surface of the socket 14 including the outer diameters, the crimping positions, the crimping claw remaining widths, the roundness, and the cylindricity of the socket 14 can be obtained based on the accurate radial position data with less variation.

Thus, as compared to a case where measurement data is acquired by manual work through use of a pair of calipers as in the related art, the present technology has less varied measurement data, is advantageous in improving reproducibility of the measurement data, and is advantageous in performing acceptance determination on the hose connector fitting 10 reliably and efficiently.

Further, when the outer diameters of the socket 14 are measured through use of the two-dimensional shape detection units 40, unlike the present embodiment, measuring the outer diameters of the socket 14 by irradiating the socket 14 with band-like shape detection light extending in a direction orthogonal to the axial center O1 is conceivable.

However, in this case, the two-dimensional shape detection unit 40 is required to be prepared correspondingly to the number of positions of the socket 14 in the longitudinal direction and in the circumferential direction, which are to be measured.

In view of this, in the present embodiment, a single two-dimensional shape detection unit 40 performs detection in a range along the axial direction of the socket 14 subjected to radial position data detection. Thus, in principle, a single two-dimensional shape detection unit 40 is sufficient, which suppresses a cost and is advantageous in obtaining various pieces of measurement data easily.

Further, in the present embodiment, based on the radial position data, which is detected by the two-dimensional shape detection units 40 completely across the circumference of the socket 14, the shape data indicating the three-dimensional shape of the surface of the socket 14 is generated, and the measurement data relating to the surface of the socket 14 is generated from the shape data.

Accordingly, this is advantageous in obtaining, from the shape data, various pieces of the measurement data at various positions of the surface of the socket 14.

Further, in the present embodiment, acceptance determination is performed based on the accurate measurement data with less variation, which is thus advantageous in performing inspection of the hose connector fitting 10 efficiently.

Further, in the present embodiment, the two-dimensional shape detection unit 40 including the light source unit 4002, the light reception unit 4004, and the calculation unit 4006 is used, which is advantageous in simplifying the configuration of the shape measuring device 34 and reducing a cost.

Further, in the present embodiment, the plurality of two-dimensional shape detection units 40 are arranged at an equal interval about the axial center O1 of the hose connector fitting 10, and hence the rotary movement portion 42 can move the two-dimensional shape detection units 40 rotationally about the axial center O1 of the hose connector fitting 10 as the center by a reduced amount.

Thus, this is advantageous in reducing a time period required for detecting the radial position data completely across the circumference of the socket 14.

Further, in the present embodiment, the fitting support portion 36 is supported by the 3-axis tables 52A and the hose support portion 38 is supported by the 3-axis table 52B, and hence the axial center O1 of the hose connector fitting 10 and the axial center O2 of the hose 30 can be aligned easily and accurately. Thus, the hose connector fitting 10 crimping the hose 30 can be aligned easily and accurately, which is advantageous in detecting the radial position data by the two-dimensional shape detection unit 40 efficiently and accurately.

The invention claimed is:

1. A shape measuring device for a hose connector fitting comprising a nipple and a socket, an outer circumferential surface of the socket being crimped inward in a radial direction within a crimping range along an axial direction of the socket under a state in which a hose is inserted into an annular space between an outer circumferential portion of the nipple and an inner circumferential portion of the socket, the shape measuring device comprising:
   a fitting support portion that supports the nipple;
   a hose support portion that supports the hose;
   a two-dimensional shape detector configured to detect radial position data of a surface of the socket in a radial direction with respect to an axial center of the hose connector fitting along a direction parallel to the axial center of the hose connector fitting, the two-dimensional shape detector comprising a light source and a light receptor; and
   a rotary movement portion that moves the two-dimensional shape detector rotationally about the axial center of the hose connector fitting as a center to cause the two-dimensional shape detector to detect the radial position data completely across a circumference of the socket.

2. The shape measuring device for a hose connector fitting according to claim 1, further comprising a computer configured to:
   generate shape data indicating a three-dimensional shape of a surface of the socket, based on the radial position data detected by the two-dimensional shape detector completely across the circumference of the socket; and
   generate measurement data relating to the surface of the socket from the shape data.

3. The shape measuring device for a hose connector fitting according to claim 2, wherein the computer is further configured to perform acceptance determination, based on the measurement data.

4. The shape measuring device for a hose connector fitting according to claim 1, wherein
   the light source is configured to irradiate a surface of the hose connector fitting with band-like shape detection light having a width direction parallel with the axial center of the hose connector fitting; and
   the light receptor is configured to receive reflection light reflected on the surface and detects position data of the reflection light being received.

5. The shape measuring device for a hose connector fitting according to claim 1, wherein a plurality of the two-dimensional shape detectors are arranged at an equal interval about the axial center of the hose connector fitting.

6. The shape measuring device for a hose connector fitting according to claim 1, wherein the fitting support portion is supported by 3-axis table and the hose support portion is supported by 3-axis table.

7. The shape measuring device for a hose connector fitting according to claim 3, wherein
the light source is configured to irradiate a surface of the hose connector fitting with band-like shape detection light having a width direction parallel with the axial center of the hose connector fitting; and
the light receptor is configured to receive reflection light reflected on the surface and detects position data of the reflection light being received.

8. The shape measuring device for a hose connector fitting according to claim 7, wherein a plurality of the two-dimensional shape detectors are arranged at an equal interval about the axial center of the hose connector fitting.

9. The shape measuring device for a hose connector fitting according to claim 8, wherein the fitting support portion is supported by 3-axis table and the hose support portion is supported by 3-axis table.

\* \* \* \* \*